Patented Mar. 26, 1929.

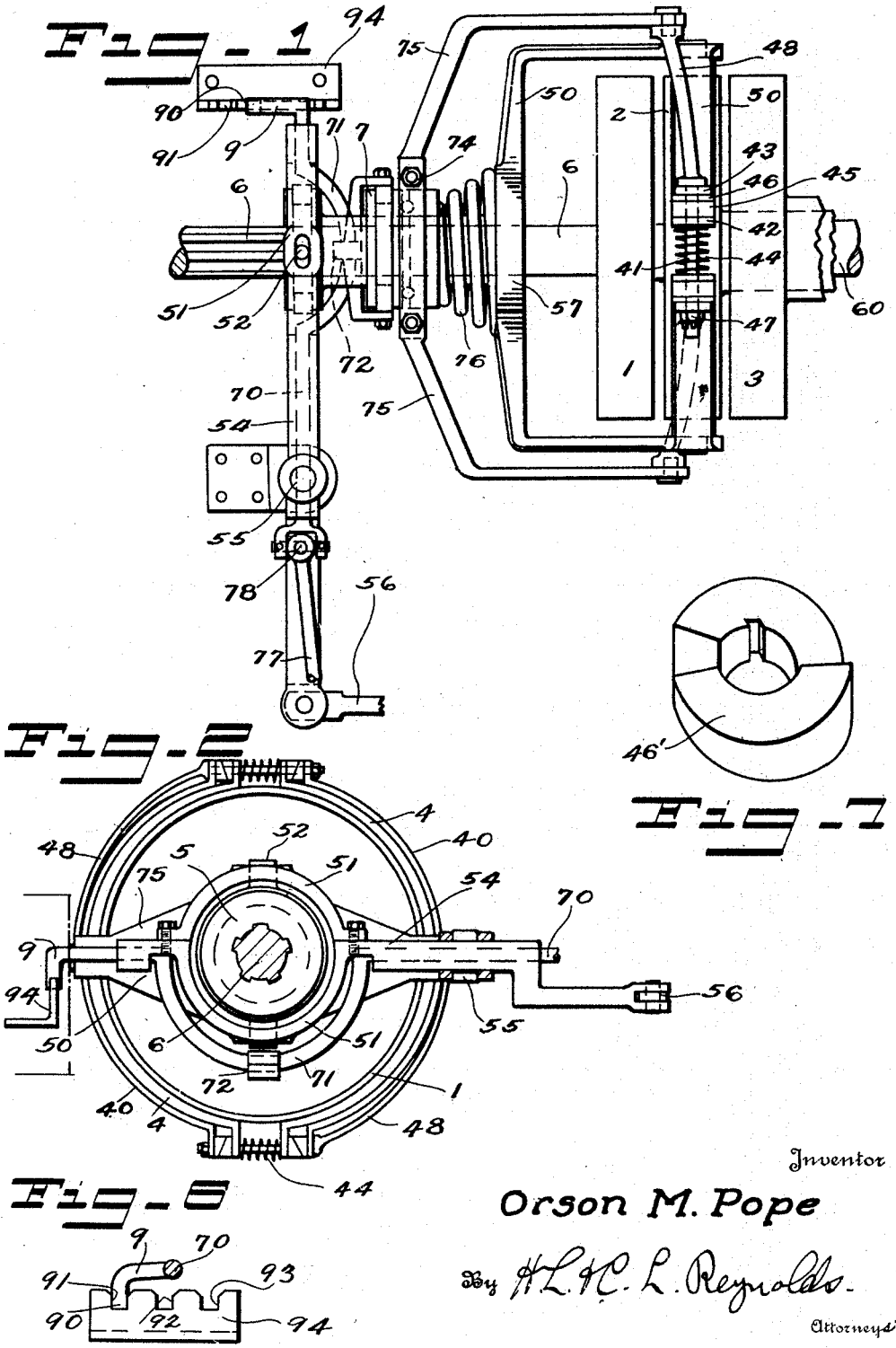

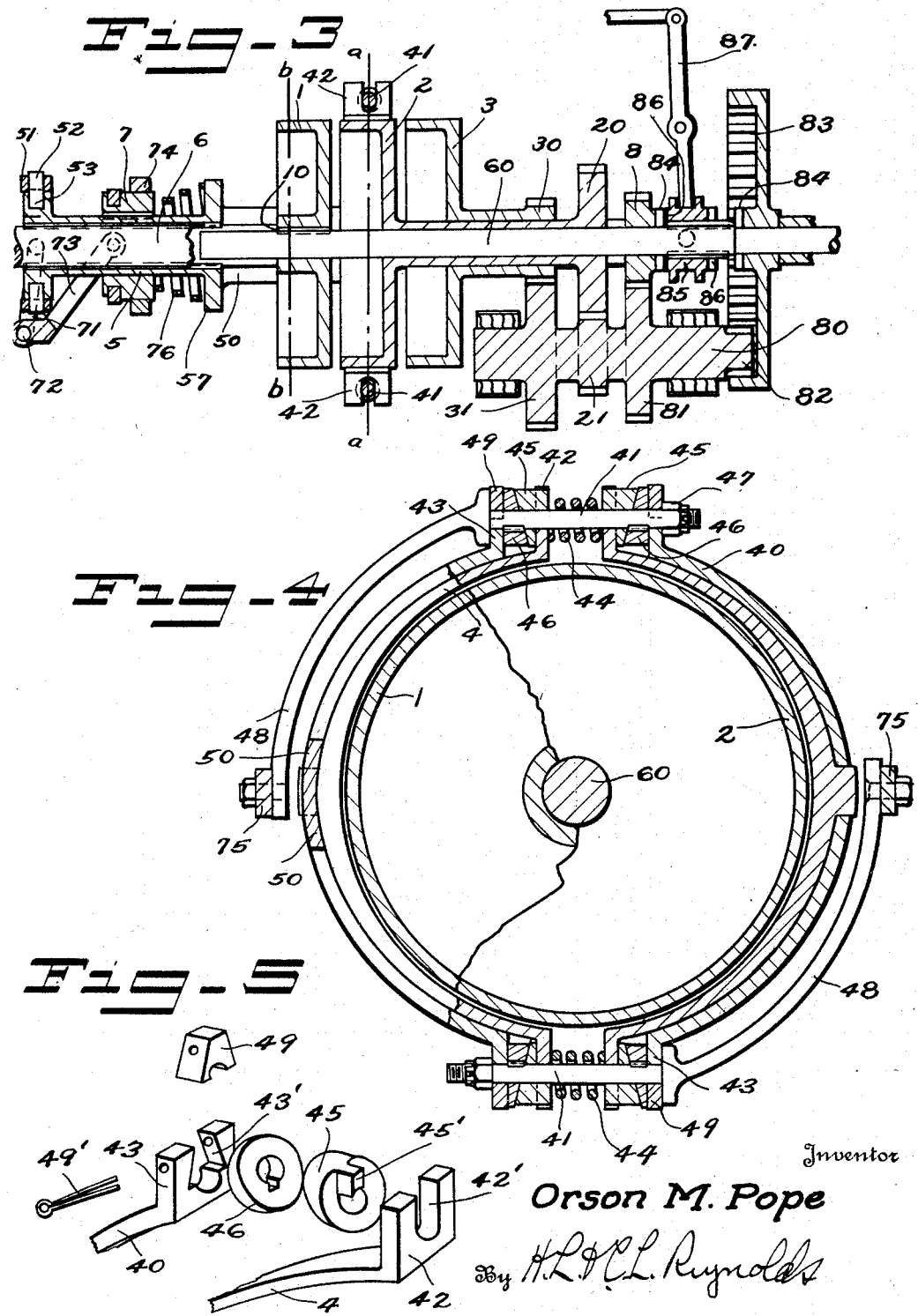

1,707,092

UNITED STATES PATENT OFFICE.

ORSON M. POPE, OF SEATTLE, WASHINGTON.

TRANSMISSION.

Application filed November 2, 1925. Serial No. 66,248.

My invention relates to transmission mechanism and, in one aspect, relates to a selective clutch device whereby a selected clutch element, one of several, may be engaged by a complemental clutch element to drive a driven shaft to which the first selected clutch element is connected directly or indirectly, the complemental clutch element being connected to the driving shaft. In another aspect it relates to the transmission gearing, by means of which the entire range of varying speeds may be obtained, including speeds in reverse, without the necessity of shifting gears, and in such manner that at the highest speed, the one most frequently in use, the train of gears is dead.

Considered from the first aspect, it is an object of my invention to provide a selective clutch mechanism whereby a selector is shiftable to be positioned to cause engagement of two complemental clutch elements, and to the provision of means for causing or permitting engagement thereof, the two means for shifting and for causing engagement being connected to operate together without interference.

Viewed from the second aspect, it is one object of my invention to provide a transmission gearing by means of which the highest speed forward may be a direct drive without the interposition or the necessity of rotating intermediate gears between the driving and driven shafts.

A further object in this connection is the provision of clutch or drive members shiftable to connect either a forward or reverse gear with the driven shaft, but so disposed that shifting is only necessary to determine the direction of movement, that is, when the car is standing still and it is desired to go either forward or backward, thus eliminating the clashing of gears due to shifting while in motion and gathering speed.

Other objects, especially those relating to structural details, will be apparent as the description progresses.

My invention comprises the novel parts, and the novel combinations and arrangements thereof, as shown in the accompanying drawings, described in this specification, and particularly defined by the claims terminating the same.

In the accompanying drawings I have shown my invention embodied in a form which is now preferred by me, it being understood that variations in the mechanical details and arrangements may be made without departing from the spirit of the invention.

Figure 1 is a plan view of a selective clutch mechanism, and Figure 2 is an end elevation thereof;

Figure 3 is an axial section through the entire clutch and transmission gearing, taken at right angles to Figure 1;

Figure 4 is a transverse section, one-half being along the line $a$—$a$ of Figure 3, and the other half being along the line $b$—$b$;

Figure 5 is a perspective exploded view of the cam or gripping members employed in the selective clutch mechanism.

Figure 6 is an elevation of the safety positioning means, and

Figure 7 is a perspective view of a modified detail.

My present invention, in one aspect, is applicable to various types of transmission gearing, as, for example, that shown in my Patent No. 1,503,005. In that patent a number of variable speed gears remain permanently in mesh and are engaged by a selective clutch mechanism which determines the particular gears to be driven. In the present instance, as in the patent referred to, I have shown a plurality of drums 1, 2 and 3, which are connected to a driven shaft 60, either directly as by the key 10, or indirectly, as through the gears 20, 30 and the like. The drums 1, 2 and 3 are preferably of the same diameter and width of face, and are mounted on the driven shaft 60 to rotate therewith or thereabout.

Complemental to the drums 1, 2 and 3 is the selector which is shown herein as comprising a ring-like member 4 adapted to be constricted upon any one of the drums according to its position. The ring 4 may, for convenience of manufacture, assembly and repair or relining, be composed of two halves retained within a second resilient ring-like member 40 by means of stub shafts 41 passing through slotted ears 42 and 43 on the rings 4 and 40, respectively. A spring 44 serves to maintain the two halves of the rings 4 and 40 positively separated, and these halves may be drawn together to constrict the ring 4 upon a drum as 2 by means of complemental cams 45 and 46, the one having a lug 45' receivable in the slot 42' of the ear 42, and the other fixed to the shaft 41. Two dove-tail caps or lugs 49, received in the dove-tail slots 43' of the ears 43, hold the shaft 41 in position, and being themselves removably secured to the ears 43, as by the cotter pins 49', permit easy removal of the entire assembly. Double-faced cam members, designated 46', as shown in Figure 7, may be employed in lieu of the single-faced cams 45 and 46, thus equalizing stresses at opposite sides of the shaft 41, and eliminating any possibility of binding. Adjustment and a means for taking up wear is provided in the castle nut 47 on the end of the shaft 41. Oscillation of the shaft, and consequent constriction of relaxation of the ring 4, is obtained through a lever 48 secured upon the opposite end of the shaft 41.

By the means above described, the ring, when in position, is constricted upon any selected drum 1, 2 or 3. It is necessary in this embodiment to shift the ring 4 itself and its control means, as well, although it will be evident that the device might be arranged with a ring 4 for each drum, the means controlling its constriction only being shifted. However, to control the shifting of the ring 4 and its control means, the ring 40 is connected through a resilient yoke 50 to a clutch sleeve 5. The sleeve 5 is mounted upon the driving shaft 6 in such a way as to permit its sliding axially thereof but to rotate therewith. This may conveniently be accomplished by a splined connection, as illustrated in Figures 1 and 2. A yoke 51 engaging pins 52 in a collar 53 loosely mounted in the sleeve 5, forms part of a lever 54 pivoted at 55 and operable by a link 56 connected to one end, by means of which the lever can be swung and the yoke 51 and sleeve 5 consequently shifted.

In order to control the constriction of the ring 4 in its several positions, the lever 54 is made hollow to permit the reception therein of a shaft 70 forming one bearing of a crank 71 connected at 72 to a link 73. The opposite end of the link 73 is connected to a collar 7, which is mounted upon and slidable axially of the clutch sleeve 5. A second ring 74 is mounted upon the collar 7 and is connected by arms 75 to the ends of the rocker arms 48. A spring 76 interposed between the collar 7 and a flange 57 of the sleeve 5 serves to maintain the collar 7 in normal retracted position with the ring 4 tight on a drum. By swinging the crank arm 71, the collar 7 is advanced against the spring 76, which advances the ring 74 and the arms 75 connected therewith and causes the rocker arms 48 to swing in a direction to expand the ring 4. Swinging of the crank arms 71 may be accomplished by means of an oscillable shaft 77 connected to the end of the shaft 70 by suitable means, as the universal joint 78.

It is quite essential that the device be so arranged that the ring 4 may not be constricted except when in proper position relative to one of the drums 1, 2 or 3; otherwise, if it were permitted to be constricted when spanning two drums, two different sets of drive gears would be connected to the driving shaft 6, with possibly disastrous results. As seen in Figure 6, safety means are provided to prevent this. They will operate also whether or not the clutch release pedal (connected to the shaft 77, but not shown) is thrown out prior to shifting, to insure release of the ring 4 during shifting. An arm 9, secured on the end of the shaft 70, must move as the shaft is swung on the pivot 55 to shift the position of the selector. The shaft 70 must rotate or oscillate on its axis to permit engagement or disengagement of the ring 4. By providing a dog 90 on the arm 9, engageable in notches 91, 92, and 93 of a fixed member 94, which may be formed as part of a housing enclosing the transmission and clutch, the shaft 70 can rock to permit engagement of the ring 4 with a drum only when the dog 90 is opposite one of the notches 91, 92 or 93. These notches can be spaced by an amount corresponding to the swing of the end of shaft 70 in shifting the ring 4 between adjacent drums, hence engagement of the dog 90 with the raised spaces between notches will prevent gripping of the ring 4 except when properly positioned opposite a single drum. The dog 90 and the notches can be so shaped that they will disengage upon swinging of the shaft 70, and this will insure disengagement of the ring 4, as the dog rides out of a notch, while the shift is being made to another drum. This is not intended to take the place of a clutch release pedal, but merely as a safety means to supplement it.

By the construction described, the means for shifting the selector and the means for expanding it or permitting its constriction may move as a unit without affecting the constricting means, and the latter may be applied at any selected position of the shiftable clutch member, but only when the constricting means is properly positioned.

It will be observed that the drum 1 is keyed directly to the driven shaft 60. Hence, when this drum is clutched, a direct drive from the driving shaft 6 to the driven shaft 60 is obtained without the interposition of the drums 2 and 3 and without the necessity of turning any of the gears. The drum 2 and its gear 20, and the drum 3 and its gear 30 are loose upon the shaft 4, as is also the forward gear 8. Each of these gears 20, 30 and 8 is connected to a complemental gear 21, 31 and 81, respectively, secured to or formed as an integral part of the countershaft 80. The countershaft, in addition, carries a gear 82 continuously in mesh with an internal gear 83, loosely mounted upon the driven shaft 60, and by means of which reverse motion is accomplished.

The aligned gears 8 and 83 are each provided with jaw clutch members 84, and a complemental clutch element 85 provided with jaws 86 to engage the jaws 84 is keyed upon the driven shaft 60 and is shiftable, as by means of a lever 87, from a neutral position to engagement with the jaws of either of the gears 8 or 83.

If it is desired to start in a forward direction, the car being at a standstill, the clutch element 85 is shifted to engage the gear 8 and connect it with the driven shaft. By engaging the drum 3, the entire train of gears then is set in motion, through the gears 30 and 31, the countershaft 80, and the gears 81 and 8, and a low forward speed is obtained. This speed can be increased by engaging the drum 2, retaining the clutch element 85 in engagement with the jaws of the gear 8. The increase of speed results from the higher ratio in gears 20 and 21, the former being connected to the drum 2. For the highest speed, the clutch element 85 is shifted to its neutral position and the drum 1 is engaged, this drum being keyed directly upon the shaft 60. Disengagement of the clutch element 85 neutralizes all of the gears. For starting the car in a reverse direction, the clutch element 85 is shifted to engage the jaws 84 of the gear 83. Engagement in turn of the drums 3 and 2 energizes all of the gears in the manner described, and permits of reverse drive of the shaft 60 at different speeds.

It is possible to drive with the shaft 60, although the form described is preferred at this time. When thus reversed, the ratio of the gears 82 and 83 must be reversed, so that 82 is the larger. So arranged, and with the clutch element 4 connected to the driven shaft, the ring 4 might be permitted to grip either drum 2 and 3, but so long as the clutch member 85 was in neutral position, no gears would turn; hence for idling they would be dead, and only the drum 1 would turn. This could not be permitted with the preferred arrangement, as the ring 4, which is always turning, would either have to be shifted to a neutral position, as to a dummy drum (not shown), or it would have to be held out, as by the throw-out pedal or by the dog 90. The arrangement of parts to accomplish these results is well within the capabilities of an ordinarily skilled mechanic, hence they have not been shown.

What I claim as my invention is:

1. In combination with driving and driven shafts, selective clutch mechanism including a plurality of drums mounted upon one of said shafts, a clutch sleeve rotative with and slidable lengthwise of the other shaft, operative connections between each of said drums and the shaft whereon they are mounted, a ring-like clutch member mounted upon said clutch sleeve, and slidable therewith into position to engage any one of said drums, a yoke engaged with said sleeve to shift it, a lever operatively engageable with said yoke, a collar slidable axially of the shaft which carries the clutch sleeve, operative connections between said collar and said clutch member to constrict the latter about a selected drum upon movement of the collar, and a crank journaled in said lever and swingable therewith, and operatively connected to said collar, said crank being rotatable independently of the lever to move said collar.

2. In combination with driving and driven shafts, selective clutch mechanism including a plurality of drums mounted upon one of said shafts, a clutch sleeve rotative with and slidable lengthwise of the other shaft, operative connections between each of said drums and the shaft whereon they are mounted, a ring-like clutch member mouned upon said clutch sleeve, and slidable therewith into position to engage any one of said drums, a yoke engaged with said sleeve to shift it, a lever operatively engageable with said yoke, a collar slidable axially of the shaft which carries the clutch sleeve, operative connections between said collar and said clutch member to constrict the latter about a selected drum upon movement of the collar, and a crank journaled in said lever and swingable therewith, and operatively connected to said collar, said crank being rotatable independently of the lever to move said collar, a safety dog projecting from and rotative with said crank, and swingable therewith as the shifting lever swings, and a fixed member positioned adjacent said dog and having a plurality of notches each corresponding to one of said drums, said notches being spaced and arranged, relative to the path of swing of the dog, to prevent rotation of the dog and its crank into position to constrict said ring-like clutch member upon a drum unless the said clutch member is properly positioned relative to a single drum.

3. In combination with a driving and a driven shaft, a sleeve slidable axially of and rotatable with one of said shafts, a collar mounted upon and slidable axially and indedendently of said sleeve, a plurality of drums mounted upon and rotatable about or with the second of said shafts, a clutch member complemental to said drums and adapted to engage any one of them, means supporting said clutch member from said sleeve, to be shifted thereby, means operatively connecting said collar and said clutch member, independently of the sleeve, to engage the clutch member with a selected drum, a pivoted arm connected to said sleeve to shift it and the clutch member, and a lever operatively connected to said collar, and journaled lengthwise of said arm and swingable therewith, to control engagement and disengagement of said clutch member in any selected position thereof.

4. In combination with a driving and a driven shaft, selective clutch mechanism comprising a plurality of drums, a clutch member complemental to said drums and adapted to engage any one of them, operative connections between each of said drums and one of said shafts and between said clutch member and the other shaft, means for shifting said clutch member into position to engage any one of said drums, means controlling engagement of the clutch member with a selected drum, positioning means including a member fixed relative to said shifting means and a second member movable therewith and controllable by said means which controls engagement of the clutch member and the drums, said second member of the positioning means cooperating with the first member thereof to permit engagement of the clutch member with a drum only when the two are properly positioned relative to each other.

5. In combination, a driving shaft and a driven shaft aligned therewith, low and intermediate gears loosely mounted on one of said shafts, a forward and a reverse gear also loosely mounted on the same shaft, means for selectively connecting either said forward or said reverse gear, or neither, to its shaft, a countershaft having gears continuously meshing with all of said first gears, a plurality of clutch members, one being operatively connected to each of said low and intermediate gears, a like clutch member keyed to the shaft which carries the low, intermediate, forward and reverse gears, a clutch element rotatable with the other shaft, complemental to said clutch members, and selectively engageable with any one thereof, and means controlling engagement of said selective connecting means with the forward or reverse gear, whereby, upon movement thereof into neutral position, said shafts may be directly connected through said clutch element and the keyed-on clutch member, without interposition of any of said gears.

Signed at Seattle, Washington, this 10th day of October, 1925.

ORSON M. POPE.